(No Model.)
C. G. MAYER.
STUFFING BOX.
No. 450,518. Patented Apr. 14, 1891.
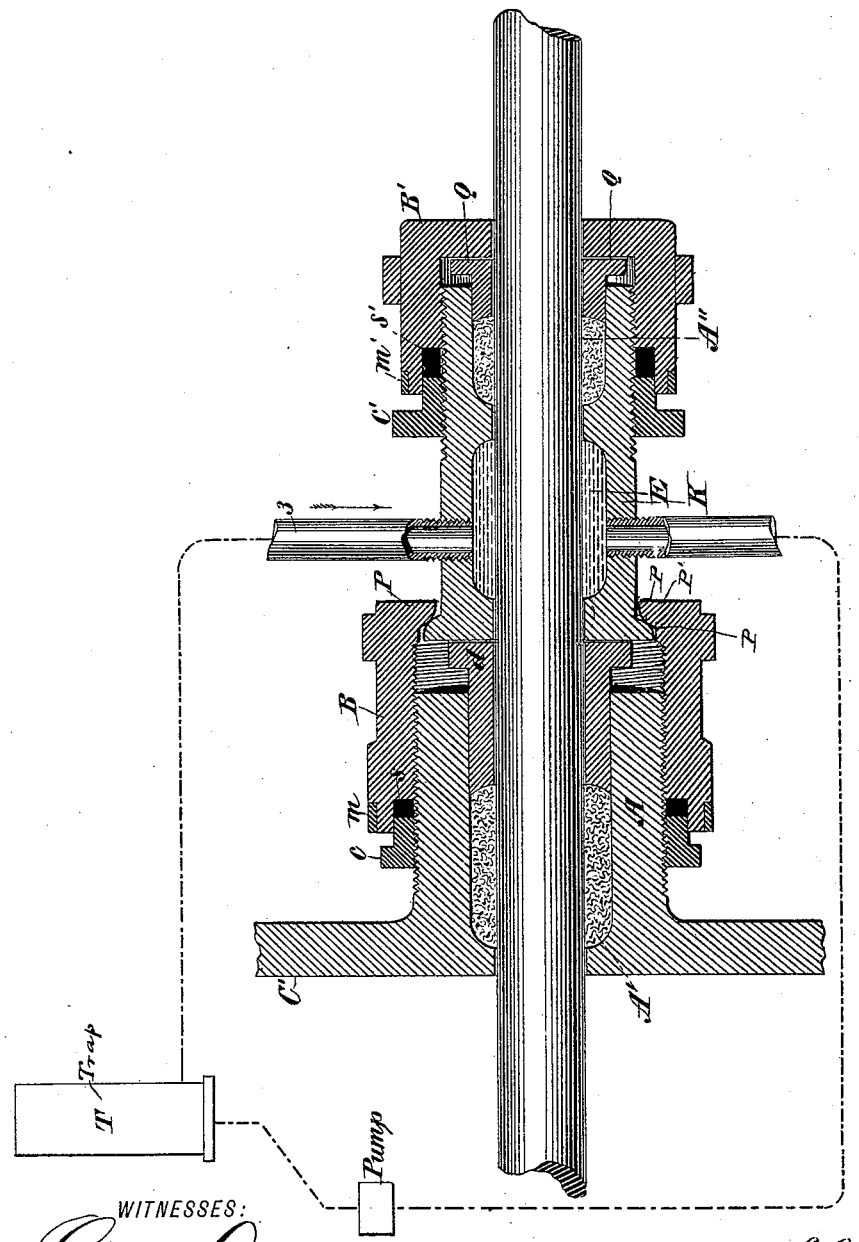
WITNESSES:
Gustave Dieterich
Fred. Huetwohl
INVENTOR
C. G. Mayer.
BY Knight Bros
ATTORNEYS

UNITED STATES PATENT OFFICE.

CHARLES G. MAYER, OF NEW YORK, N. Y.

STUFFING-BOX.

SPECIFICATION forming part of Letters Patent No. 450,518, dated April 14, 1891.

Application filed December 29, 1886. Serial No. 222,893. (No model.)

*To all whom it may concern:*

Be it known that I, CHARLES G. MAYER, a citizen of the United States, residing at New York city, in the county and State of New York, have invented certain new and useful Improvements in Stuffing-Boxes, of which the following is a specification.

My invention relates to a stuffing-box which is especially constructed and adapted to be used in connection with a double-acting gas-pump, the parts being so arranged as to pack against high pressure on one side or end and low pressure on the other side or end. For this purpose the stuffing-box is provided with a centrally-located oil-chamber with a packing in one end of a size and quantity sufficient to pack against the high pressure existing in gas-pumps of refrigerating-machines.

The stuffing-box which forms the subject of this application is more particularly adapted for use in connection with the system shown and described in my application, Serial No. 222,892, filed of even date with this, in which my present device is also shown and described and in which the low-pressure system or tank is connected with the oil-chamber of the stuffing-box, and the lubricating compound is conveyed from the high-pressure system into the low-pressure system and from thence by natural circulation or otherwise into the oil-chamber of the stuffing-box, and thus it is necessary only to stuff the outer end of the box against low pressure. There are various reasons for and advantages of such an arrangement. In the first place, as the piston-rod in moving back and forth in the stuffing-box and the gas-pump will convey on its outstroke more or less of the gas it is compressing, it becomes a problem as to what is the best disposition that can be made of such escaping gas and how it can be trapped and reconveyed into the refrigerating system without entailing any loss of such gas. The disadvantage of any such loss is twofold, for in the first place it is extremely disagreeable and offensive, and in the second place it is expensive. These are drawbacks which obtain in those systems which lubricate the stuffing-box and pump by means of a lubricating material circulating directly from the high-pressure system. These drawbacks and disadvantages are entirely obviated and dispensed with in my present invention, for as the piston-rod is moving toward and through the stuffing-box, bringing, perhaps, a small percentage of the volatile gases with it, the said gas or gases, if they pass the packing in the packing-chamber and the metallic bearings beyond, will arrive in the oil-chamber, which being connected with the low-pressure system the gas will immediately expand and escape through the connecting pipe or pipes into the low-pressure trap of the refrigerating apparatus; but inasmuch as this oil-chamber must be swiveled to the main stuffing-box it becomes necessary to provide a joint that will permit the revolution of said chamber without permitting the escape of the gas, which is very volatile and which at this point is under great pressure. For this purpose I find it necessary to form a joint somewhat like a ball-and-socket joint, but differing very materially therefrom, in that instead of the socket being concave, as usual, it is convex, thus presenting to the ball of the joint a narrow but even bearing-surface, against which the ball firmly impinges throughout its whole circumference.

I will now refer to the accompanying drawing, which forms a part of this specification, and which represents a longitudinal section of my invention.

The arrangement consists in the stuffing-box A, cast integrally with the cylinder-head C' of the gas-pump. It is provided with the packing-chamber A', the nut B, having the jam-nut $c$, and the sleeve $d$. The oil-chamber E is formed in the casing K, and the said casing is provided with the outer and smaller packing-chamber A''. The outer end of the stuffing-box is provided with a sleeve Q, a nut B', and also with a jam-nut $c'$. The oil-chamber E is tapped by oil-pipe 3, which is in connection with a low-pressure trap T. The nuts B and B' have wrought-iron rings $m$ and $m'$ shrunk on for the purpose of strengthening them. The spaces $s$ and $s'$ are filled with rubber or leather packing to provide against any gas escaping through the threads. The nut and the casing K are provided with overlapping shoulders P, which form a swivel-joint, and each of these shoulders is provided with a convex surface P, said surfaces being nicely ground and impinging each other, so as to form a perfectly-tight joint. The bearing-surfaces between the sleeve Q and the nut B' are also ground to produce a tight joint.

It will be seen that the stuffing-box consists of two chambers for packing, one on each side of the oil-chamber. The inner packing-chamber A' must pack against high-pressure gas and the outer chamber A'' against the atmosphere or low-pressure gas and oil in the oil-chamber E. Should any high-pressure gas escape through the inner packing A', it will immediately expand when it reaches the oil-chamber E into low-pressure gas, escaping through pipe 3 into the low-pressure system. Consequently the packing in stuffing-box A'' needs only to keep in low-pressure gas or oil.

The pipe 3 may be constructed to extend from the oil-chamber E to the trap T, and the circulation may be back and forth through this pipe, or it may be extended around and brought up on the under side of the oil-chamber, the said pipe being provided with a pump, as shown, to assist the circulation. This latter construction is employed where the pipes are of considerable length or where there are two or more of the refrigerating-machines arranged side by side.

Having thus described my invention, what I claim as new therein, and desire to secure by Letters Patent, is—

1. The combination, with the annular nut B, of the casing having swivel connection with said nut and provided with an oil-chamber and a pipe leading into said chamber, substantially as set forth.

2. The combination, with the stuffing-box A, of the casing K, movably connected to said stuffing-box and having the oil-chamber E and packing-chamber A'', and a nut for holding packing in said chamber A'', substantially as set forth.

3. The combination, with the stuffing-box, of the casing K, swiveled thereto and having an oil-chamber, and pipes leading to and from said chamber, substantially as set forth.

4. The combination, with the stuffing-box, of the oil-chamber connected therewith, as described, and having a shoulder, the annular nut B, also provided with a shoulder, the two parts being arranged so as to form a swivel-joint at P, both of said shoulders having convex faces contacting with each other, as shown and described.

5. The combination, with the stuffing-box A, having a stuffing-chamber A', of the sleeve $d$ in said box, adapted to bear upon the packing in said chamber A', the nut B, secured over the end of said box, the casing K, provided with an oil-chamber and a packing-chamber and having a swivel-joint connection with said nut B and resting against said sleeve $d$, both members of said joint having convex faces contacting with each other, the nut B' on the end of the casing K, and a pipe leading to said oil-chamber, substantially as set forth.

CHARLES G. MAYER.

Witnesses:
HERBERT KNIGHT,
FRANK A. BAKER.